Figure 2:
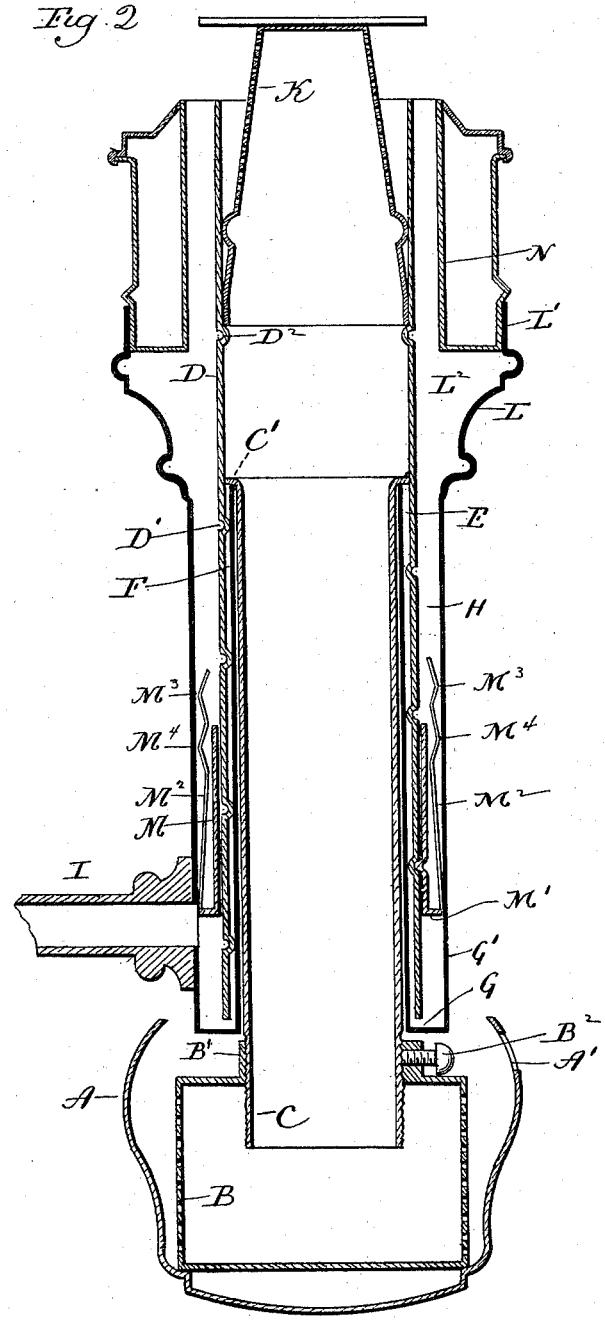

(No Model.) 2 Sheets—Sheet 1.
L. F. GRISWOLD.
CENTRAL DRAFT LAMP.
No. 586,028. Patented July 6, 1897.
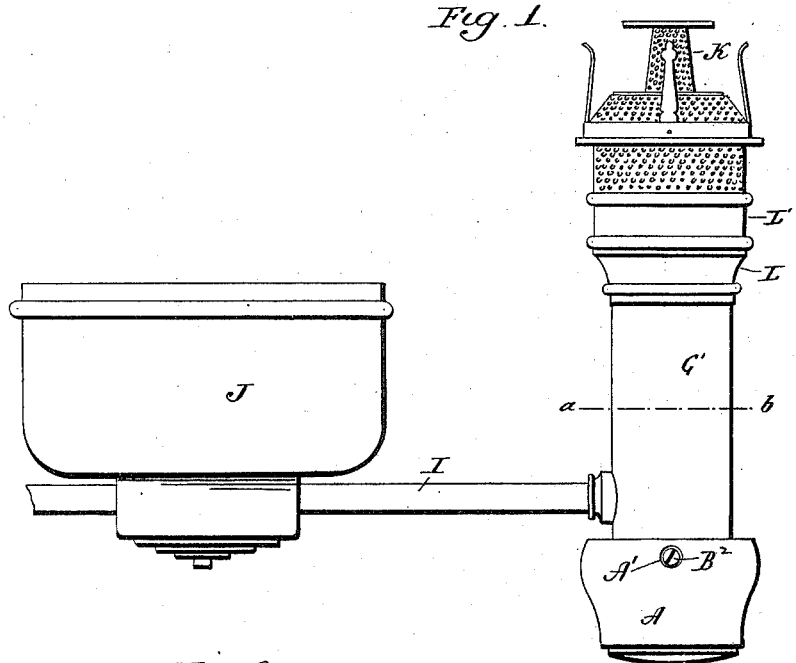
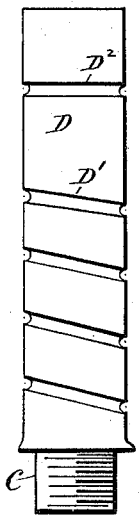
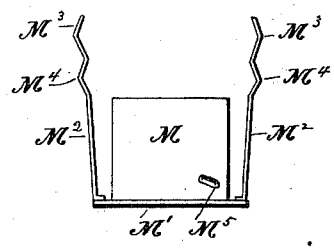
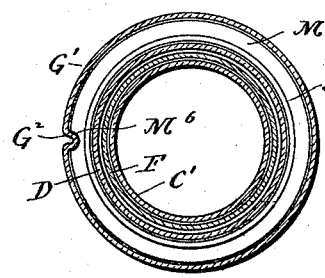
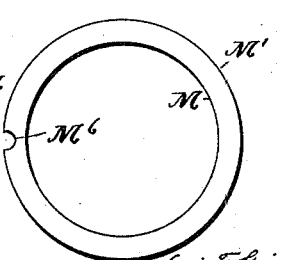

(No Model.) 2 Sheets—Sheet 2.

L. F. GRISWOLD.
CENTRAL DRAFT LAMP.

No. 586,028. Patented July 6, 1897.

Witnesses. Lewis F. Griswold, Inventor.
By Attys.

UNITED STATES PATENT OFFICE.

LEWIS F. GRISWOLD, OF MERIDEN, CONNECTICUT, ASSIGNOR TO THE CHARLES PARKER COMPANY, OF SAME PLACE.

CENTRAL-DRAFT LAMP.

SPECIFICATION forming part of Letters Patent No. 586,028, dated July 6, 1897.

Application filed May 27, 1896. Serial No. 593,241. (No model.)

*To all whom it may concern:*

Be it known that I, LEWIS F. GRISWOLD, of Meriden, in the county of New Haven and State of Connecticut, have invented a new Improvement in Central-Draft Lamps; and I do hereby declare the following, when taken in connection with the accompanying drawings and the letters of reference marked thereon, to be a full, clear, and exact description of the same, and which said drawings constitute part of this specification, and represent, in—

Figure 1, a view in side elevation of a central-draft lamp constructed in accordance with my invention; Fig. 2, a view thereof in central vertical section through the burner, central draft-tube, drip-cup, and appurtenant parts; Fig. 3, a detached view, in side elevation, of the central draft-tube; Fig. 4, a similar view of the wick-carrier; Fig. 5, a view in transverse section on the line $a\ b$ of Fig. 1 and showing the sliding connection between the wick-carrier and the body-tube; Fig. 6, a detached reverse plan view of the wick-carrier.

My invention relates to an improvement in central-draft lamps, the object being to provide them with simple, compact, and efficient wick-adjusting devices constructed with particular reference to convenience of operation.

With these ends in view my invention consists in certain details of construction and combinations of parts, as will be hereinafter described, and pointed out in the claims.

In illustrating my invention I have shown it as applied to a lamp of the student type, but I would have it understood that it is applicable to all central-draft lamps—that is to say, all lamps constructed on the Argand principle.

In carrying out my invention I provide the drip-cup A of the lamp with a centrally-arranged drum-shaped air-strainer B, comprising a perforated cylinder and heads, of which the lower head forms the bottom of the strainer and is imperforate and of which the upper head forms the top of the strainer and has a large opening formed in its center, the said upper head being provided with a collar B′, arranged concentrically with the said opening, to which it corresponds in diameter, and internally threaded and furnished with a transversely-arranged set-screw $B^2$, rendered accessible to a screw-driver by an opening A′, formed in the drip-cup proper near the upper edge thereof. The said air-strainer is entirely located within the said cup, the edge of the cup extending above the upper edge of the collar B′, applied to the upper head of the air-strainer, and the cup and strainer being permanently secured together. The said collar and air-strainer as thus constructed receive the externally-threaded lower end of the operating central draft-tube C, over the lower end of which the collar and strainer are screwed, whereby the strainer, and hence the drip-cup proper, are removably connected with the lower end of the said tube, to which they are fastened by means of the screw $B^2$, which connects the drip-cup with the tube, so that the tube may be rotated in either direction by grasping the cup. The said drip-cup, it will be observed, is connected with the lamp solely by means of the air-strainer contained within it. The air-strainer itself performs an important function in straining the air and breaking it up into fine currents before it enters the lower end of the operating central draft-tube, which conducts the air to the wick-tube D, which conducts it to the air-distributer K, which is set within the upper end of the said wick-tube D.

The upper end of the operating-tube C is turned outwardly to form an annular flange C′, by means of which the tube C is rigidly connected with the inner wall of the wick-tube D, the same having a spiral screw-thread D′ rolled into it.

As herein shown, the tube C is connected with the wick-tube D at a point well below the upper end thereof, and in fact at a point not much above its vertical center. This construction provides ample room for the reception in the upper end of the wick-tube of the perforated air-distributer or cone and also provides against the rising of oil to the flame in case of accident, for in case there should be an excess of oil thrown into the burner it will rise only to the height of the flange C′ at the upper end of the operating-tube, and hence not high enough to be ignited by the flame. The said tube C and the wick-tube D together form the central draft-tube of the lamp. The operating-tube C is smaller in diameter than the wick-tube D, so that an annular chamber E is formed between them for the reception of a suspension-tube F intermediate in diameter between the diameters of the two tubes mentioned, open at its upper end and secured at its lower end to an inwardly-turned horizontal flange G, formed at the lower end of a body-tube G', as clearly shown in Fig. 2. The said suspension-tube F constitutes the inner wall and the tube G' the outer wall of an annular oil-chamber H, to which oil is supplied through the tubular arm I, which connects the burner of the lamp with the reservoir J thereof and also supports the burner. The central draft-tube, consisting of the operating-tube C and the wick-tube D, is supported, as shown, by the bearing of the flange C' of the operating-tube upon the upper end of the suspension-tube F, which supports the draft-tube and provides a bearing upon which the same is rotated. The lower end of the wick-tube D clears the flange G, as clearly shown in Fig. 2, and therefore does not interfere with the free rotation of the draft-tube. The air-distributer K, which may be of any approved construction, is set into the upper end of the wick-tube, its lower end being supported upon an inwardly-projecting circumferentially-arranged horizontal bead $D^2$, formed therein. A tapering ring L, applied to the upper end of the body-tube G' and larger in diameter than the same except at its extreme lower end, is furnished with a vertical flange L', which receives the burner N, which may be of any approved construction and secured to the flange L' in any approved manner.

The wick is carried by means of a carrier consisting, as shown, of a band M, made just enough larger in diameter than the wick-tube D to ride freely up and down thereupon and constructed at its lower end with an outwardly-turned flange M', which provides for the attachment of two spring wick-gripping jaws $M^2$ $M^2$, located opposite each other, constructed and arranged so as to exert a normal effort to spring apart and release the wick, and having their upper ends bent to form two very oblique V-shaped bends $M^3$ $M^4$, the apices of which extend outward, so as to ride upon the inner wall of the body-tube G'.

The wick-band M is provided with an inclined inwardly-projecting bead-like projection $M^5$, which takes into the spiral screw-thread D' of the wick-tube D, so that when the wick-tube is turned in one direction or the other the wick-carrier will be raised or lowered, as the case may be. When the wick-carrier is in any position on the wick-tube D which brings the lower bends $M^4$ $M^4$ of the spring-arms $M^2$ $M^2$ below the upper end of the body-tube G', the same will force the inwardly-bent upper ends of the arms into the wick, so that they will clutch and hold the same, but when the wick-carrier is raised by the rotation of the wick-tube, so that the said bends $M^4$ $M^4$ emerge into the chamber $L^2$, formed by the tapering burner-supporting ring L, the arms are freed for springing outwardly away from the wick, which they release for being adjusted or renewed; but the spring wick-gripping jaws will never fly outward so as to release the wick when the burner is in place for the reason that before the lower bends $M^4$ $M^4$ of the jaws $M^2$ $M^2$ have been cleared from the upper end of the body-tube G' their upper ends will have passed upward into the "outer" wick-tube N, as it is called, of the burner N, thus preventing the jaws from releasing their grip upon the wick when the burner is in place. When, however, the burner is removed and there is nothing to engage the upper ends of the jaws, they will fly apart and release the wick as soon as the bends $M^4$ $M^4$ are cleared of the tube G', as before stated.

To prevent the wick-carrier from rotating when the draft-tube is rotated, it is provided with a sliding connection with the body-tube G'. To this end the said body-tube is constructed throughout its length with an inwardly-projecting vertically-arranged rib $G^2$, Fig. 5, which takes into a notch $M^4$, formed in the flange $M^6$ of the carrier, as clearly shown in Fig. 6.

To raise or lower the wick, it is simply necessary to turn the drip-cup A in one direction or the other, whereby the operating-tube C will be correspondingly turned and cause the wick-tube D to be rotated and the wick-carrier to be raised or lowered. It is not necessary to state that it is much more convenient to effect the raising and lowering of the wick through the drip-cup than through the burner itself, as has heretofore been done, as the drip-cup is more naturally and conveniently taken hold of and because it is not heated as the burner is.

It will be seen from the foregoing description and from an inspection of the drawings that the vertically-movable wick-carrier is raised and lowered by turning the drip-cup with which it is operatively connected, as herein set forth, by means of the central draft-tube itself.

It is apparent that in carrying out my invention some changes from the construction herein shown and described may be made. I would therefore have it understood that I do not limit myself to the exact construction herein shown, but hold myself at liberty to make such alterations as fairly fall within the spirit and scope of my invention.

Having fully described my invention, what I claim as new, and desire to secure by Letters Patent, is—

1. In a central-draft lamp, the combination with an operating central draft-tube having its lower end screw-threaded, of a wick-carrier connected therewith so as to be raised and lowered thereby, a drip-cup, and a drum-shaped air-strainer located entirely within the said cup to which it is permanently fastened, and secured to the threaded lower end of the said draft-tube which is rotated in either direction by the cup.

2. In a central-draft lamp, the combination with a body-tube, of a suspension-tube located within the body-tube than which it is smaller in diameter so as to form an annular oil-chamber between the two tubes, an externally-threaded wick-tube extending downward into the said oil-chamber, an operating central draft-tube located within the suspension-tube, projecting above and below the same, having its upper end turned outward to form a flange which is rigidly connected with the inner face of the said wick-tube at a point well below the upper end thereof, and which rests upon the upper end of the said suspension-tube for supporting the wick-tube, a drip-cup containing an air-strainer, attached to the projecting lower end of the operating central draft-tube which is rotated in either direction by means of it, a wick-carrier located within the said annular oil-chamber and coacting with the wick-tube for being raised and lowered thereby, and an air-distributer or thimble located in the upper end of the wick-tube at a point above the operating central draft-tube and receiving the strained air rising through the said operating central draft-tube from the air-strainer in the drip-cup.

3. In a central-draft lamp, the combination with a body-tube, of a suspension-tube located within the body-tube than which it is smaller in diameter so as to form an annular oil-chamber between the two tubes, a flaring burner-supporting ring secured to and extending above the upper end of the said body-tube, a burner adapted to be supported in the said ring, and having an outer wick-tube, a threaded wick-tube entering the said oil-chamber, an operating central draft-tube located within the suspension-tube and connected at its upper end with the inner wall of the said threaded wick-tube at a point well below the upper end thereof, and at its lower end extending downward through and projecting below the said suspension-tube, a drip-cup secured to the projecting lower end of the said operating central draft-tube, and a wick-carrier comprising a band located upon the wick-tube, and coacting with the threads thereof for being vertically moved thereby, and also comprising spring wick-gripping jaws which normally engage with the body-tube and with the said outer wick-tube, but which expand into the burner-supporting ring and release the wick when the burner is removed from the said ring.

4. The combination with a drip-cup, of a drum-shaped air-strainer consisting of a perforated cylinder and heads, located entirely within the drip-cup, its upper head being furnished with a screw-threaded collar adapting the strainer and cup to be secured to the threaded lower end of the draft-tube of a lamp of the Argand type.

In testimony whereof I have signed this specification in the presence of two subscribing witnesses.

LEWIS F. GRISWOLD.

Witnesses:
 GEO. D. SEYMOUR,
 LILLIAN D. KELSEY.